United States Patent
Wellington

(10) Patent No.: US 7,686,914 B2
(45) Date of Patent: Mar. 30, 2010

(54) DECORATIVE LAMINATED PLASTIC/METAL PANELS

(75) Inventor: Mary Boone Wellington, Nashua, NH (US)

(73) Assignee: MB Wellington Studio, Inc., Nashua, NH (US)

(*) Notice: Subject to any disclaimer, the term of this patent is extended or adjusted under 35 U.S.C. 154(b) by 400 days.

(21) Appl. No.: 11/674,071

(22) Filed: Feb. 12, 2007

(65) Prior Publication Data

US 2008/0193692 A1    Aug. 14, 2008

(51) Int. Cl.
*B32B 37/00* (2006.01)
(52) U.S. Cl. .................. 156/278; 156/307.4; 156/308.2
(58) Field of Classification Search .................. 156/63, 156/99, 100, 153, 182, 276, 278, 307.4, 308.2; 428/38, 203, 204
See application file for complete search history.

(56) References Cited

U.S. PATENT DOCUMENTS

| | | | |
|---|---|---|---|
| 4,801,495 A | | 1/1989 | van der Hoeven |
| 5,286,290 A | * | 2/1994 | Risley ........................ 106/401 |
| 5,373,422 A | | 12/1994 | Hodkinson |
| 6,562,163 B1 | | 5/2003 | Wellington |
| 6,743,327 B2 | * | 6/2004 | Schober .................... 156/309.6 |
| 6,780,275 B2 | | 8/2004 | Wellington |
| 7,510,297 B2 | * | 3/2009 | Dobija et al. ............... 362/147 |
| 2003/0178126 A1 | | 9/2003 | Wellington |
| 2005/0166496 A1 | | 8/2005 | Frag |
| 2005/0241759 A1 | | 11/2005 | Goodson et al. |
| 2006/0155226 A1 | | 7/2006 | Grim et al. |
| 2006/0178064 A1 | | 8/2006 | Balthes et al. |

OTHER PUBLICATIONS

International Search Report and Written Opinion dated Jul. 25, 2008 issued in related International Patent Application No. PCT/US08/053604 (9 pages).

* cited by examiner

Primary Examiner—Philip C Tucker
Assistant Examiner—Sing P Chan
(74) Attorney, Agent, or Firm—Grossman, Tucker, Perreault & Pfleger, PLLC

(57) ABSTRACT

A transparent/translucent double-layer of plastic sheet material which transmits light is provided, comprising a pair of transparent/translucent sheet materials, wherein one side may be of matte finish, the other side color coated, wherein the sheet materials include decorative metal articles located therebetween and are joined together with the matte finish facing outward. The material may display a high level of luminosity and the appearance of being lit-from-within. A light transmitting fire-rated panel including a spring-loaded frame is also provided.

6 Claims, 5 Drawing Sheets

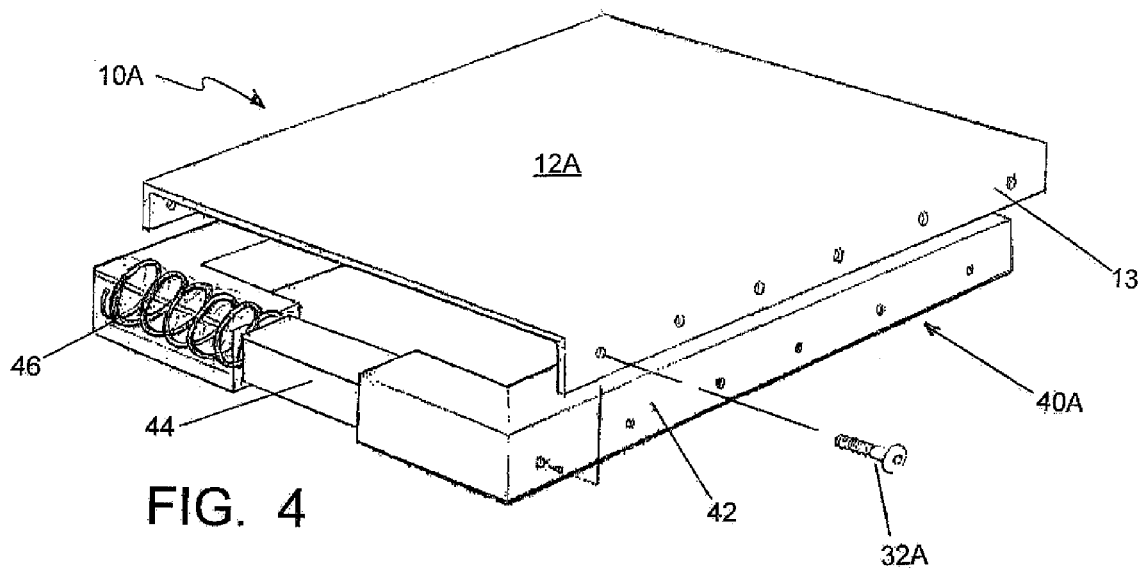
FIG. 4
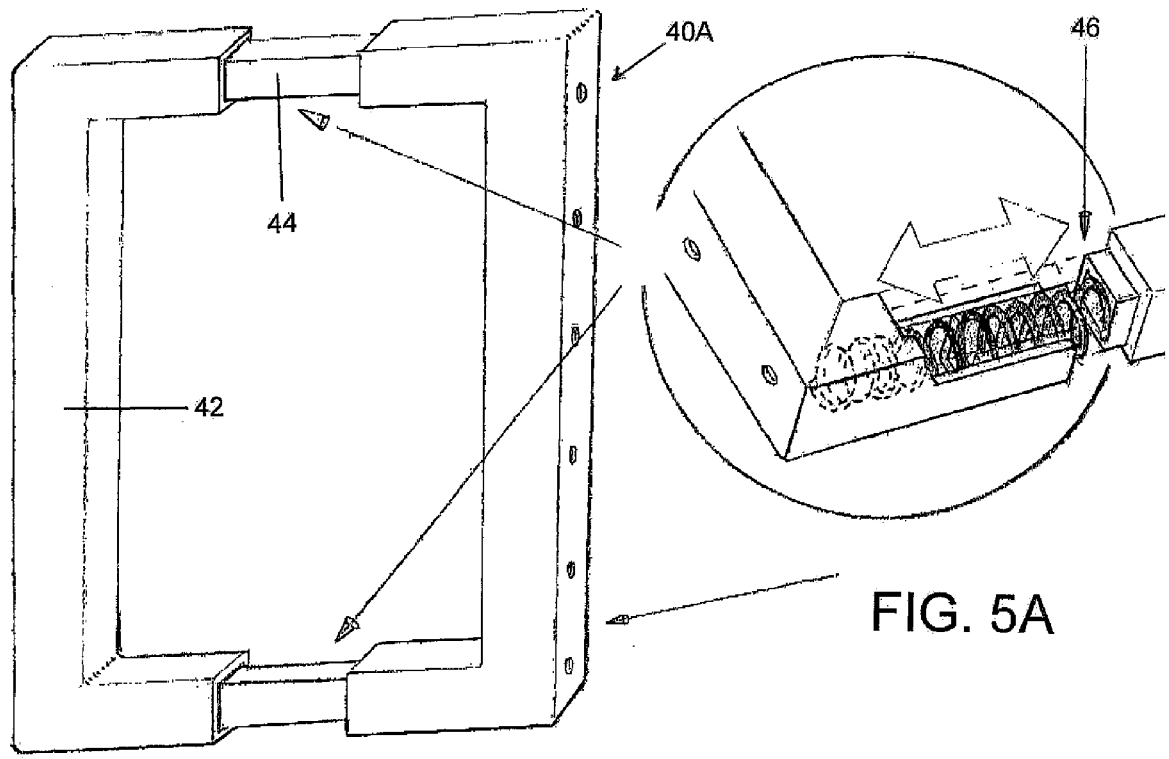
FIG. 5
FIG. 5A

DECORATIVE LAMINATED PLASTIC/METAL PANELS

FIELD OF THE INVENTION

This invention relates to the preparation of decorative light-emitting plastic panels for the purpose of preparing unique ornamental designs for both residential and commercial applications. More particularly, the invention herein relates to the use of sheets of uniformly colored, generally transparent plastic material, between which decorative metal articles may be placed to be used in a variety of artistic/decorative applications, and which may be fire-rated.

BACKGROUND OF THE INVENTION

The use of plastic material, and more specifically, transparent plastic material, for decorative applications, is well-known. Along such lines, acrylic materials, both in clear form and in solid color form, have been available for quite some time. For example, a "PLEXIGLAS" brand acrylic is a cast thermoplastic acrylic sheet produced in a number of formulations to provide specific physical properties for a number of applications. Along such lines, solid color translucent acrylic sheets are widely used in the illuminated sign industry. "PLEXIGLAS" is a registered trademark for such acrylic sheets of the Rohm and Haas Company. In addition, "LUCITE" acrylic sheets have been available from DuPont de Nemours & Co. Both brands of acrylic sheet have therefore found their way into decorative consumer products.

The use of colorful and durable sheets of other non-acrylic materials as a surface for various articles of furniture also exists in the prior art. For example, the use of the well-known "FORMICA" brand laminate on counter tops is well known. In addition, other similar materials generally of a solid color, or of a marbled decorative pattern because of the nature of the process to form the laminate, have been used as a decorative outer layer for furniture or accessories.

It has, however, been difficult to produce colorful, durable, and decorative transparent or translucent panels made from acrylic or polycarbonate sheets which may be used to contain metal decorations therebetween. This problem is largely founded on obstacles to containing and positioning the decorations in a contemporaneous fashion and in a manner which is bright, lustrous, and resistant to fading, while at the same time exhibiting an appearance which is extraordinarily brilliant and exhibits an apparent depth which is attractive to the eye.

It has also been difficult to produce such decorative panels which may be fire-rated and, in addition, may be back-lit.

Upon review of all of the above, it becomes clear that none of these approaches of the prior art has been entirely satisfactory. First, the depth, color and brilliance heretofore exhibited by prior art panels has been marginal at best. Second, the ability to form and maintain decorative patterns of a contemporary design between the sheets of plastic on a selective/custom basis for use in manufacturing contemporary back-lit sheeting designs thereby providing a "soft" lighting effect, entirely pleasing to the viewer, and of a quality and durability has not yet been attainable. Finally, it has been difficult to achieve a fire rated, backlit panel, particularly one which may be kept free of distortion due to thermal expansion/contraction.

Thus, it is a principal object of this invention to provide a transparent or translucent plastic material design, of layered construction, containing metal articles, which is bright, lustrous, and resistant to fading and scratching, while at the same time being relatively inexpensive to manufacture and which maintains such properties as applied to either a commercial or residential design application. Such material may provide a powerful medium for communicating color, defining space, and changing the way that things are seen It is also a further object of this invention to provide a transparent or translucent plastic material particularly suitable for back-lighting which again permits the use of color of extraordinary brilliance and depth, while at the same providing protection from chipping, peeling, fading and thermal distortion, and having a fire rating.

In addition, it is also an object of this invention to provide a durable and decorative transparent laminate containing metal articles for decorative applications, which is "double-sided" in the sense that it transmits different color patterns on each side of equivalent quality as in a "single-sided" configuration and may be used as partitions, etc. having an outstanding appearance when viewed from either side, appearing to be lit-from-within.

These and other objects of the invention will become apparent from a review of the detailed description of the invention which follows.

SUMMARY OF THE INVENTION

In product form, the invention first comprises a pair of transparent/translucent plastic sheets, each sheet with a pair of opposed surfaces, wherein one surface may be of a matte finish, and wherein the opposite surface may be coated with or may enclose a color coating composition. The colored sheets may be connected together mechanically and may include one or more decorative metal articles inserted therebetween to provide a double-side product each side having either the same or a different color pattern, wherein the color patterns may be protected by their back-to-back configuration. Each colored coating of such double-side product may remain capable of a back-lighting effect. The metal articles may comprise a variety of decorative shapes, materials, finishes and forms to provide an attractive appearance when used as walls, partitions, modular panels, stands, desks, doors, ceilings and related residential, commercial and industrial furnishings. The laminates of the present invention may be designed to be fire-rated and may be cold-formed to shape. The laminates may also be connected together in modular fashion.

The invention also comprises a fire rated panel capable of being back-lit and including a spring-loaded frame for preventing distortion of the panel due to thermal expansion or contraction.

In method form, the present invention relates to a method of preparing a decorative laminated article comprising the steps of: (a) providing a first transparent/translucent plastic sheet with a pair of opposed surfaces; (b) applying a matte finish to one surface of the transparent sheet; (c) applying a color coating composition over that surface of the sheet that is not of a matte finish, wherein said color coating composition comprises a liquid based coating composition combined with a powdered pigment; (d) repeating steps (a)-(c) above to produce a second transparent/translucent plastic sheet containing a matte finish and color coating; (e) placing any of a variety of metal decorative articles between the sheets; and (f) joining said first and second sheet with said matte finish of said sheets facing outward to form a decorative laminate. Decorative bolts or rivets may be used for joining and add to the attractiveness of the laminate by forming patterns.

BRIEF DESCRIPTION OF THE DRAWINGS

These and other objects, features and advantages of the present invention will become apparent to those skilled in the art upon reference to the following written description and accompanying drawings in which:

FIG. 4 is a perspective view of a fire rated display panel according to the present invention.

FIG. 5 is a rear view of a corner of the panel of FIG. 4 illustrating a mechanism for compensating for thermal expansion of the panel. FIG. 5A is an exploded view of the corner portions of FIG. 5.

DETAILED DESCRIPTION OF THE INVENTION

Figure 1A:
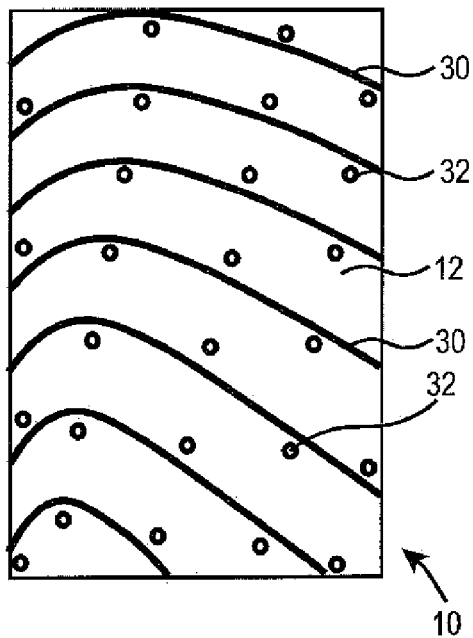
FIGS. 1A-1G are plan views of exemplary panels embodying the present invention.

The present invention is described more fully hereinafter with reference to the accompanying drawings, in which various embodiments of the invention are shown. This invention, may, however, be embodied in many different forms and should not be construed as limited to the embodiments set forth herein; rather, these embodiments are provided so that this disclosure will be thorough and complete, and will fully convey the scope of the invention to those skilled in the art.

For elements common to the various embodiments of the invention, the numerical reference character between the embodiments is held constant, but distinguished by the addition of an alphanumeric character to the existing numerical reference character. In other words, for example, an element referenced at 10 in the first embodiment is correspondingly referenced at 10A, 10B, and so forth in subsequent embodiments. Thus, where an embodiment description uses a reference character to refer to an element, the reference character applies equally, as distinguished by alphanumeric character, to the other embodiments where the element is common.

In a first exemplary embodiment, the present invention is directed at a laminated decorative panel comprising two sheets of plastic which may include a variety of metal decorative articles located therebetween, the sheets prepared according to the teachings of U.S. Pat. Nos. 6,562,163 and 6,780,275, both assigned to the assignee of the present invention and included herein in their entirety.

An acrylic or polycarbonate composition sheet may be used as the starting material for the present invention. The acrylic or polycarbonate sheet may be used in any thickness, but preferably sheets of about 0.03-2.0 inches in thickness are employed. The acrylic or polycarbonate sheets may be either cast or extruded sheet. Thicker sheets may also be used, although in the case of polycarbonate sheets thicker than about 0.5 inches may require the lamination of thinner sheets to form such thickness.

However, in the broad context of the present invention, it can be appreciated that other transparent or translucent type plastic materials may be suitable, provided they adhere to the oil-based/powdered pigment paint formulation as described herein. Along such lines, other transparent plastics include, but are not limited to polyester, polysulphone, poly-4-methyl-1-pentene, polyamide, and polyurethane type resins.

The transparent or translucent type plastic sheet may then be sanded on one side to provide a matte finish. By such, it is meant that one surface of the sheet may be made to provide a non-glossy or dull finish. However, the surface may still remain translucent, such that light may pass through the sheet but the light may be diffused so that objects on the other side cannot be distinguished. The preferred pattern may be achieved, for instance, by an electric or air-powered random orbital sander with a 0.18 inch orbit pattern and 80, 100 or 120 grit disks. Also contemplated herein is the use of larger orbit equipment that would provide a similar effect, but over a much shorter time period. In addition, as part of the method herein, the sanding machinery may be yoked together to increase production time. Also worthy of note is that during the sanding operation, a vacuum may be applied to remove dust for safety, as well as for the purpose of maintaining an exposed surface for the sanding operation.

The non-sanded surface may then be coated, which can be accomplished in any of the conventional ways of applying coatings, such as by brush, roller or by spray. Alternatively, the coating may be applied first, followed by sanding. In any event, in the context of the present invention it has been found preferable to apply the coating as noted above, and pat the surface using a pad made of cloth, plastic, and/or paper to even out the coverage and add texture.

With regards to the coating composition, broadly considered, either an alkyd oil-based or latex-based liquid coating composition may be suitable. An alkyd oil-based liquid composition may be used either alone or in combination with a powdered pigment. In such regard, up to about 30% by weight powdered pigment may be combined with about 70% of an alkyd oil-based liquid coating. However, in the broad context of the present invention, about 1-25% of powdered pigment may be combined with about 99%-75% of the alkyd oil based coating, including increments of 1.0% therebetween.

Accordingly, it can therefore be appreciated that a particularly preferred combination may be about 10.0% by weight powdered pigment and about 90.0% of the liquid alkyd oil-based ingredient.

In addition, with respect to the liquid alkyd oil based ingredient, such may be prepared by combining an alkyd medium with an alkyd oil paint, wherein both products are available from Windsor Newton, the gel medium sold under the tradename "Liquin". In such regard, one may combine about 1-99% of the alkyd medium with about 99-1% of the alkyd oil paint, depending upon the particular color and intensity ultimately desired. That being the case, it can also be appreciated herein that in the final preferred embodiment, an alkyd medium may be combined with an alkyd oil paint, along with powdered pigment, wherein the concentration of the three components are varied in accordance with the color intensity requirements of the final product. The powdered pigments used herein therefore may include, but are not limited to, pearl white, iridescent gold, blue over green, green over gold, violet and blue interference powder, all of which are available from Central Art Supply of New York.

Although one embodiment herein is a double-sided application, wherein two transparent/translucent sheets, color coated as described above, are joined together with the matte sides facing out, the invention herein also applies to a single-sided application. In regards to such single-sided applications which are not permanently affixed to a substrate material, which can be either fiberboard or wood, it has been found useful to apply a relatively thin (0.2-0.5 inch) backing of transparent sheet, such as polycarbonate, to the colored surface, to protect such from damage. Alternatively, if the colored sheet material herein is to be glued to a substrate, it has been found preferable to coat the colored side with a water based latex primer to form a barrier between the colorant and any glue, such as contact cement, that may interact with, e.g., the preferred alkyd color coating. The backing sheet may then act as the second sheet for enclosing the metallic decorative articles.

Finally, as noted above, the present invention makes use of an alkyd oil-based medium for the unique color coating effect produced herein. Those skilled in the art will recognize that an alkyd oil-based medium typically references a polyester type coating, modified by the addition of fatty acids derived from mineral and vegetable oils. However, in the broad context of the present invention, any oil-based paint will operate, as well as latex-type formulations, in combination with a powdered pigment, to provide the unique light-transmitting sheet materials described herein.

FIGS. 1A-1G are plan views of exemplary decorative laminates prepared according to the present invention, each illustrating a different appearance due to the inclusion of various types of metallic articles held between two sheets of transparent/translucent plastic. At least one of the sheets, as described above, may have a matte finish on the outside and a paint surface on the opposite side. The sheets may be of clear or colored plastic. In FIGS. 1A-1G, the decorative laminate 10 comprises a first sheet 12 backed by a second sheet 22 (not shown) with a variety of metal articles 30 held in place between the sheets 12, 22. The sheets may be held together mechanically by fasteners 32, such as rivets, bolts, etc. which may have a variety of end features to add to the distinguished appearance and decoration of the laminate. Such end features may include any variety of shapes, including but not limited to, star-shaped, square, hexagonal, octagonal, spherical, numbers and letters. It is contemplated that the sheets described above may not include a matte finish on an outer surface, particularly where thicker sheets may be used which may tend to mask the view of the metal articles placed therebetween for decoration. In that case, the outer surface may be smooth.

The metal articles 30 may be curved pieces of various shapes as shown in FIGS. 1A-1F to provide a variety of decorative patterns. The metal may include, but not be limited to, aluminum, stainless steel, bronze, brass and metal covered plastic and may vary in surface finish, texture, gloss and reflectivity. The laminates including these metal articles may find use in a wide variety of furnishings for offices, residential, commercial and industrial applications including, but not limited to, office partitions, room dividers, desks, stands, walls, ceilings, doors, furniture, displays and shelving. It is further contemplated that decorative articles comprising other materials than metal may be utilized in such decorative laminates, providing such nonmetallic articles allow the laminate to achieve a fire rating. Examples of such nonmetallic articles may include, but not be limited to flame retardant plastics and flame retardant plastics having a metal coating (for instance, plated, vacuum deposited, sputtered, ion coated, etc.).

The laminates may be formed of translucent/transparent plastic sheets typically of about 0.03 inches to about 2.0 inches in thickness and having a surface area from about 4 to 50 square feet. Smaller laminates may be attached together in modular form to form larger laminates having a variety of appearances due to the decorative metallic articles placed between the plastic sheets. Such laminates may include such features as channels or grooves which may engage to provide snap-fit attachments.

In one particular embodiment, sheets of 1/32 inch polycarbonate may be combined with decorative metallic articles contained therebetween to form a 1/16 inch fire-rated panel.

In another particular embodiment, the laminates of the present invention may include channels to route wiring and such.

Figure 1B:
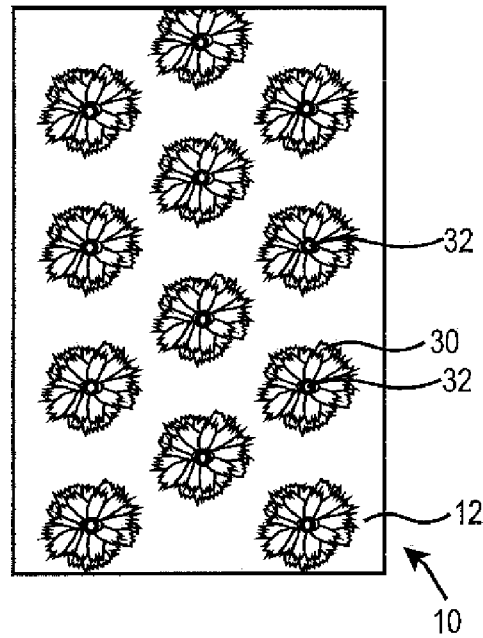
Figure 1C:
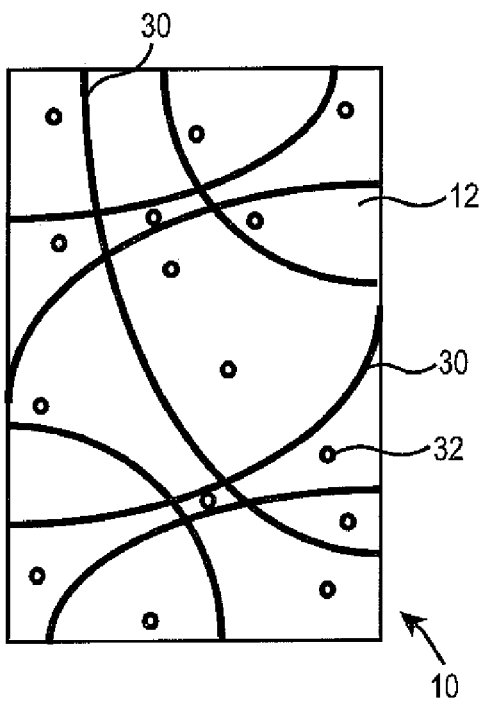
Figure 1D:
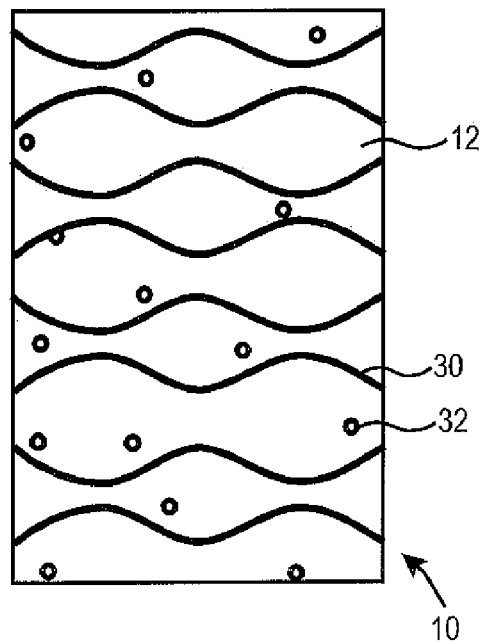
Figure 1E:
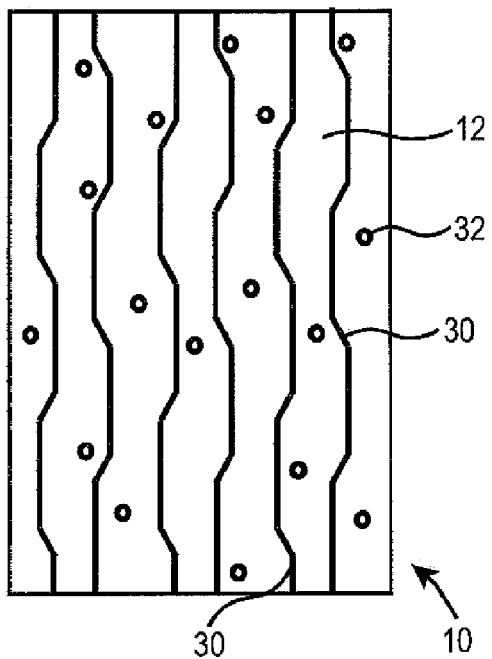
Figure 1F:
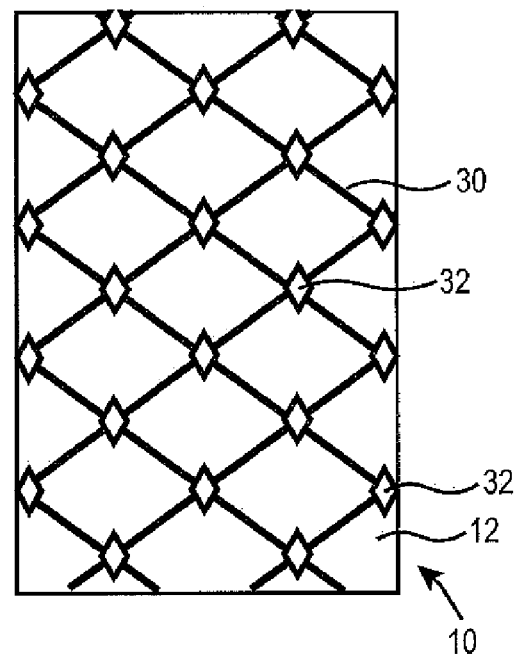

FIG. 1B illustrates a laminate which includes discrete shapes of metallic articles which may be used to decorate a panel. Again, nearly any decorative shape which may be formed of metal may be used.

Figure 1G:
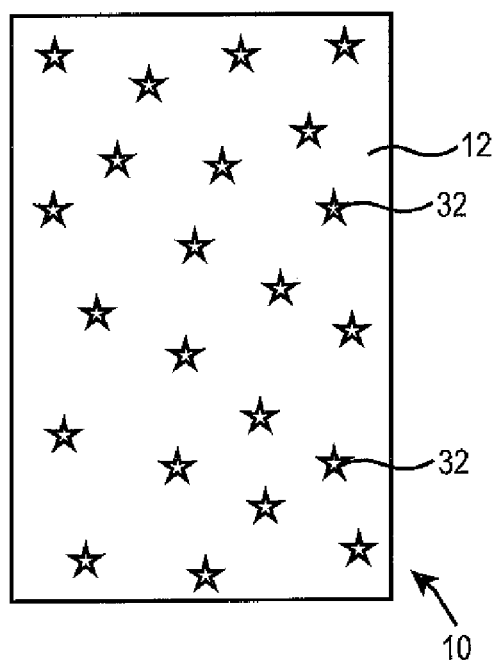

FIG. 1G illustrates the use of a plurality of discreet fasteners having various end features (rivet heads, bolt heads, nuts, etc.) 32, in this case shaped as stars, to decorate the laminate.

Figure 2A:
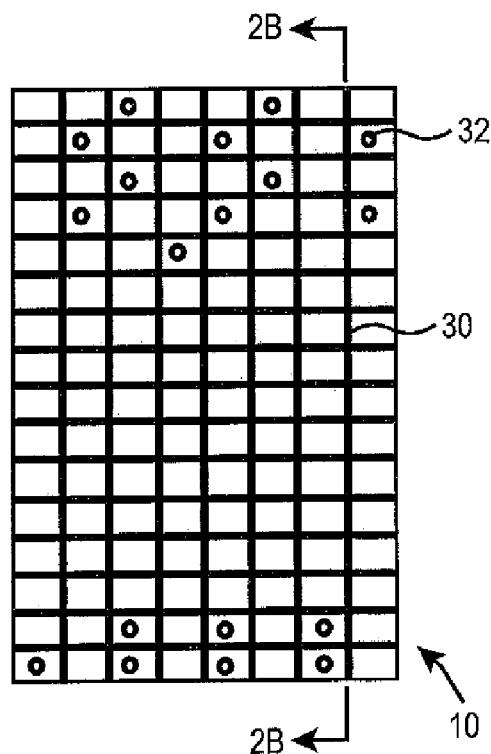
FIG. 2A is a plan view of another exemplary embodiment of a panel according to the present invention.
Figure 2B:
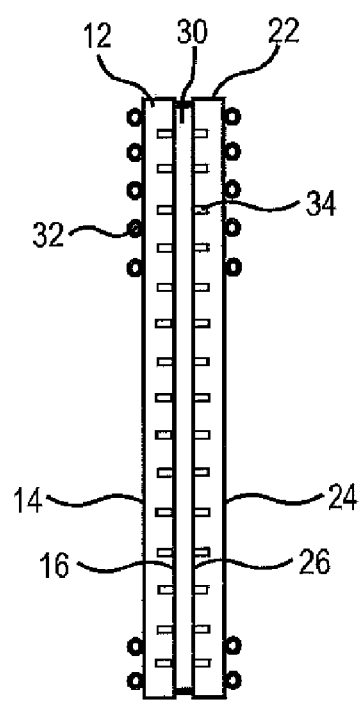
FIG. 2B is a cross-sectional view of FIG. 2A taken along lines 2B-2B.

FIGS. 2A and 2B illustrates another embodiment of a decorative laminate according to the present invention, wherein the sheets are slotted to receive the metal articles, in this instance a metal grid.

FIG. 2A is a plan view of the laminate 10 with a grid of metal 30 located between two sheets 12 and 22 (not shown). Again, fasteners 32 hold the two sheets together.

FIG. 2B is a side view of FIG. 2A taken along line 2B-2B and illustrates a series of slots 34 in each of the sheets 12, 22 which the metal grid 30 may fit in to. This view also illustrates the matte surfaces 14 and 24 and painted surfaces 16 and 26 of plastic sheets 12 and 22.

Laminates according to the present invention may be freestanding, and may comprise one or both panels being backlighted or even the visual effect of being lit-from-within.

Figure 3:
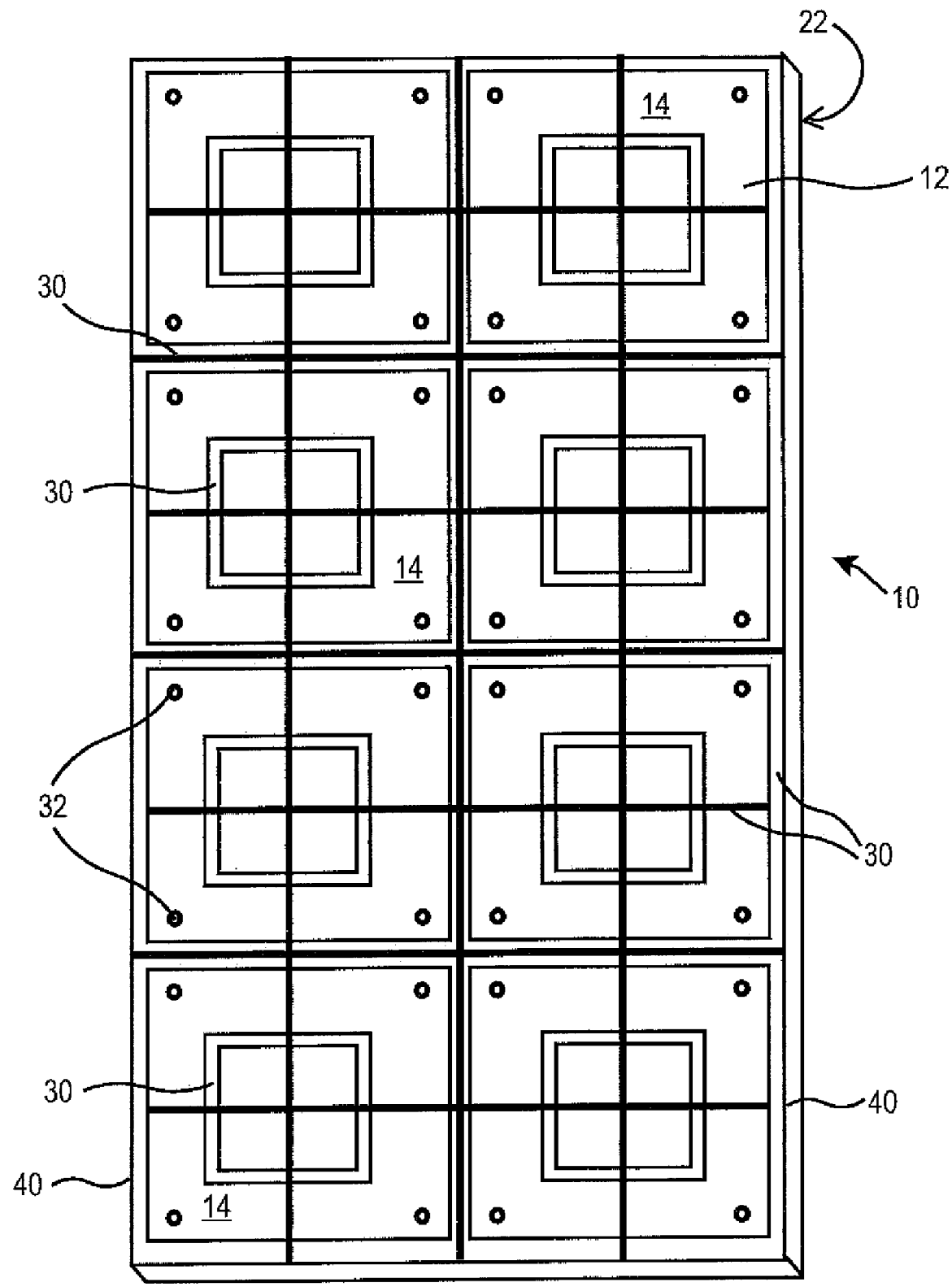
FIG. 3 is a perspective view of another exemplary embodiment of a panel according to the present invention.

FIG. 3 is a perspective view of another embodiment according to the present invention wherein two sheets of plastic 12, 14 enclose a metallic framework 30 having a rectangular design. Fasteners 32 hold the laminate together. A metallic edging 40 may be applied over the outside of the laminate.

It is further contemplated that the plastic sheets may be attached together using other than mechanical means of fastening, including but not limited to, adhesives, plastic welding and hook-and-loop fasteners.

In a related exemplary embodiment, a transparent or translucent colored panel capable of being lighted from behind may be constructed to achieve a fire rating of 1 by being comprised of a sheet of polycarbonate of about 1/32 inch to about 1/16 inch in thickness. Such a sheet or laminate of sheets may require a frame to provide stability and rigidity. It has been found that such thin sheet(s) may become wavy or slightly distorted due to thermal excursions, that is, the sheet may expand due to higher ambient temperatures, yet the periphery of the sheet may be restrained by the frame. A solution to this problem of waviness or distortion of the transparent or translucent sheet is illustrated in FIG. 4.

A decorative transparent or translucent colored panel 10A, capable of being backlit, and having a Uniform Building Code I fire rating (or National Fire Protection Association Class A) may comprise a 1/16 inch thick (nominal) sheet 12A of polycarbonate attached to a frame 40A. The polycarbonate may be Lexan® 9030 from General Electric. Testing may be done according to ASTM E84. The sheet 10A may have a flange 13 cold formed along one or more edges for attachment to the frame 40A. A plurality of fasteners 32A may be used to securely attach the flange 13 of the sheet 10A along the sides of the frame 40A. The panel 10A may thus be constructed to provide a large decorative rigid panel having a fire rating and having no visible means for support.

To provide allowances for the panel 10A to expand due to thermal excursions, as shown in FIG. 5, the frame 40A may comprise a plurality of corner elements, or side elements including corner portions, and spacer elements which engage one another. For instance, a tubular channel 42 may be located on each side of the panel which includes corner portions and bar stock elements 44 may interconnect the corners to form the frame 40A. The bar stock 44 may be slightly smaller in outside dimensions than the inside dimensions of the channel 42 to provide a snug fit when the bar stock 44 is fitted inside the channel 42. For instance, the channel 42 may comprise an aluminum or plastic extrusion having an outer dimension of about 1 inch and the bar stock 44 may similarly be aluminum or plastic having an outside dimension of, for instance, about 7/8's of an inch, such that a snug fit may be obtained. Preferably, the flanges for the panel are located on opposite vertical sides, thus allowing linear expansion of the width of the panel.

As shown in exploded view in FIG. 5A, to provide that the frame 40A maintains the panel 10A from distorting or becoming wavy due to changes in temperature, a spring 46 may be included in the corner portions of one or more of the channels 42. The spring may be of a rating such that it is capable of compensating for thermal expansion and/or contraction of the panel. The spring 46 may be placed under a small amount of compression, for instance about 10-25%, when the panel 10A is assembled to ensure that the assembly will not rattle. In one particular example, a 26 lb. rated coil spring about ¹³⁄₁₆'s of an inch in diameter and 3 inches in length having a wire size of 0.09 inches was used. The frame is shown in exaggerated size (not to scale) for clarity of the description. The relative dimensions of the sheet and frame may not be as depicted.

It is further contemplated that the bar stock 44 may be of a shape other than square, for instance round or even hollow as long as the dimensions allow it to retain the spring 46 in place in the corner channel 42. In addition, it is further contemplated that the corners of the frame may be of bar or solid stock and engage a channel between such corners, the channel slipping over the bar stock and containing the spring.

While the descriptions herein have been directed at a relatively flat panel, it is contemplated that such panels may also be curved and have a corresponding curved frame.

The description and drawings illustratively set forth the presently preferred invention embodiment. We intend the description and drawings to describe this embodiment and not to limit the scope of the invention. Obviously, it is possible to modify these embodiments while remaining within the scope of the following claims. Therefore, within the scope of the claims one may practice the invention otherwise than as the description and drawings specifically show and describe.

What is claimed is:

1. A method of preparing a decorative layered article comprising the steps of:
    (a) providing a first transparent/translucent plastic sheet with a pair of opposed surfaces as a first layer, said sheet having a thickness of about 0.03-2.0 inches;
    (b) applying a matte finish to one surface of said transparent/translucent sheet;
    (c) applying a color coating composition over the other surface of the first transparent/translucent plastic sheet, wherein said color coating composition comprises a liquid based coating composition combined with a powdered pigment, said coating composition comprising an alkyd based coating composition wherein said alkyd based composition is a mixture of about 70-99% (wt) alkyd oil based coating and 30-1% (wt) powdered pigment;
    (d) providing a second transparent/translucent plastic sheet with a pair of opposed surfaces as a second layer, wherein said second sheet has a thickness of about 0.005-0.02 inches;
    (e) providing a plurality of decorative shapes; and
    (f) joining said first and second sheet together with said matte finish of said first sheet facing outward and with said color coating compositions facing inward wherein said plurality of decorative shapes are contained between said sheets and said color coating composition exhibits a back-lighting effect.

2. The method of claim 1 wherein said first transparent/translucent plastic sheet comprise poly(methylmethacrylate) or polycarbonate.

3. The method of claim 1 wherein one of said opposed surfaces of said second translucent/transparent plastic sheet is of a matte finish and joining said first and second sheet together with said matte finish of said first sheet facing outward and with said matte finish of said second sheet facing outward and with said color coating compositions facing inward and said color coating composition exhibits a back-lighting effect.

4. The method of claim 1 further including the steps of (g) providing a plurality of decorative fasteners and (h) attaching said sheets together with said decorative shapes contained therebetween with said plurality of fasteners.

5. The method of claim 1 wherein said plurality of decorative shapes comprise metal.

6. The method of claim 1 wherein said plurality of decorative shapes comprise a fire retardant plastic.

\* \* \* \* \*